United States Patent [19]

Hoover

[11] 4,337,799
[45] Jul. 6, 1982

[54] THREAD PROTECTOR

[76] Inventor: C. Roger Hoover, 7950 Ellinger, Houston, Tex. 77040

[21] Appl. No.: 252,917

[22] Filed: Apr. 10, 1981

Related U.S. Application Data

[63] Continuation-in-part of Ser. No. 189,314, Sep. 22, 1980, abandoned.

[51] Int. Cl.³ ............................................. B65D 59/06
[52] U.S. Cl. ..................................... 138/96 T; 138/89
[58] Field of Search ....................... 138/89, 96 R, 96 T

[56] References Cited

U.S. PATENT DOCUMENTS

| | | | |
|---|---|---|---|
| 1,000,375 | 8/1911 | Cable | 138/96 T |
| 2,251,897 | 8/1941 | Severn | 138/96 T |
| 4,020,873 | 5/1977 | Palarino | 138/96 T |
| 4,157,100 | 6/1979 | Turk | 138/96 T |
| 4,239,062 | 12/1980 | Callicoatte | 138/96 R |

*Primary Examiner*—James E. Bryant, III
*Attorney, Agent, or Firm*—Gunn, Lee & Jackson

[57] ABSTRACT

A thread protector for the external threads of pipes comprising a thread cap structure that is composed of plastic material and defines internal threads that are adapted to receive the externally threaded pin portion of a pipe. The outer extremity of the thread cap is formed to define a reduced diameter receptacle portion that receives a mating metal cap structure in such a manner that the thread cap and metal cap define a substantially contiguous annular outer surface. The metal cap is formed to define an annular body portion that defines a plurality of spaced apertures that are adapted to receive the plastic material of the thread cap to establish an interlocked relation between the plastic and metal cap structure. The metal cap defines a substantially planar circular end wall flange forming an opening through which an end wall portion of the plastic inner body protrudes. A plurality of projections extend from the plastic end wall and are oriented in substantially rectangular manner to enable a straight tool, such as a bar or screwdriver to engage at least two of the projections and thus facilitate rotation of the thread protector for installation and removal. The plastic end wall structure is also formed to define a rectangular central opening into which a rectangular tool may be inserted for installation and removal of the thread protector and for lifting of pipe sections by means of cable and hook pipe handling systems. External integral plastic ribs are provided to enhance manual handling capability.

7 Claims, 7 Drawing Figures

THREAD PROTECTOR

This is a continuation-in-part of application Ser. No. 189,314, filed Sept. 22, 1980 on behalf of C. Roger Hoover, and entitled THREAD PROTECTOR, now abandoned.

FIELD OF THE INVENTION

This invention relates generally to thread protectors for protecting the threads of pipes from damage during handling operations. More specifically, this invention is directed to the provision of a thread protector structure incorporating an internally threaded plastic body that is received by external threads of the pipe for protection thereof and wherein a metal cap structure is interconnected with the plastic body to enhance the structural integrity of the thread protector at the outer portion thereof and to facilitate installation and removal of the thread protector by means of simple, readily available tools.

BACKGROUND OF THE INVENTION

Under circumstances where exploration activities are being conducted for petroleum products such as oil and natural gas, it is customary to drill deep wells from the surface of the earth to oil or gas bearing subsurface earth formations. Wells of this nature must be lined with large diameter pipe which is typically referred to as a well casing, which pipes are typically interconnected by means of threads. The wells are drilled by rotating a drill at the lower extremity of a drill string. The drill string is defined by a large number of interconnected drill pipe sections that are connected by means of threads. After the well has been drilled and production is in order, production tubing is introduced into the well which extends from a well head that is located at the surface and interconnected with the well casing. The production tubing is positioned within the casing and extends to one or more production zones intersected by the well bore. The tubing strings are defined by threaded joints of tubing that are connected in assembly.

During drilling operations and especially during production operations, it is likely that high pressure conditions may be encountered. It is necessary, therefore, that the threaded connections of the casing and tubing the capable of withstanding significantly high pressure differential without leaking. It is necessary, therefore, that the threads of the casing or tubing be in excellent, undamaged condition in order that leakage will not occur at the threaded joints. During drilling operations, the drill stem is typically subjected to extremely high internal pressure since drilling fluid is forced through the tubing string under high pressure generated by pumps of the well drilling equipment. The threads of the various joints of drill pipe are, therefore, required to be in excellent, undamaged condition in order to enable the drill string to withstand the internal pressure to which it is subjected.

Virtually all wells for petroleum products require large amounts of well casing, drilling pipe and production tubing. After manufacture of the pipe, it is typically handled a number of times before it actually reaches the drill site and is utilized during drilling or production installation. In handling the pipe, if the pipe threads are not protected, it is likely that the threads of the pipe will be damaged through contact with other objects. It is desirable, therefore, to provide the pipe with a thread protector structure that facilitates protection of the external threads of the pipe during the various handling operations that occur prior to installation or use of the pipe in a well.

The various pipe sections that are introduced into the well bore, whether well casing, drill pipe, production tubing, etc., are brought to the well site by trucks and are then off loaded onto horizontal pipe storage racks by means of hook and cable lifting apparatus. Hooks are inserted into each extremity of the pipe and a lifting cable, to which the hooks are assembled, is moved upwardly by a suitable lifting cable. Alternatively, the pipe sections may be simply rolled down a ramp from the truck bed to the pipe storage rack. Thread protectors and desirable to prevent the threads from becoming damaged during such handling.

When pipe is moved from the pipe storage rack to the drilling rig, a pipe receptacle is placed about the pipe and the pipe is moved end-wise to the rig. The trailing end of the pipe typically drags along a ramp to the rig. The thread protector must have sufficient wear resistant capability to withstand dragging of the pipe in this manner and yet provide protection against damage to the threads of the pipe.

Thread protectors are typically of quite inexpensive construction so that loss or damage thereof will not constitute a particularly adverse financial condition. It is required, however, that thread protectors be capable of withstanding severe blows at the pipe threads without allowing the threads to become damaged. In some cases, pipes thread protectors have been formed completely of plastic material such as in the case shown in U.S. Pat. No. 4,139,023 to Turley or combinations of plastic and metal material as set forth in U.S. Pat. No. 2,212,423 of Lytle. Thread protectors may be retained in assembly with the pipe structure by threaded connection as in the case of the Turley and Lytle patents or, in the alternative, may be retained by any other suitable interlocking mechanism such as shown by Kahn, et al in U.S. Pat. No. 2,156,221. Other thread protector patents of general interest to this subject matter include U.S. Pat. Nos. 1,974,546 of Shipley; 2,133,049 of Shimer; 2,213,430 of Irwin, et al; 2,580,762 of Grenier, et al and 2,824,579 of Groah, et al.

SUMMARY OF THE INVENTION

It is a primary feature of the present invention to provide a novel thread protector for the external threads of pipes which incorporates a yieldable material of high intensity, capable of withstanding severe impacts and preventing damage to the threads of a section of pipe.

It is also an important feature of this invention to provide a novel thread protector structure that incorporates an end portion of significant structural integrity, thereby providing the pipe with exceptional protection against damage by contact with objects during pipe handling procedures, especially during dragging of pipe sections to the working floor of the drilling rig.

It is also a feature of this invention to provide a novel thread protector structure for pipes having the capability of being received in thread protecting assembly with the externally threaded pin portion of pipes such as drill pipes, having tapered threads.

Yet a further feature of this invention concerns the provision of a novel thread protector structure having the capability of efficient installation to and removal from the externally threaded portion of a section of pipe through the use of simple readily available tools such as spanner wrenches, drive sockets, screwdrivers, pry bars and the like.

Among the several features of this invention is contemplated the provision of a novel thread protector structure which is of simple construction, is reliable in use and is of low cost nature.

Basically, the present invention is directed to the provision of a thread protector structure incorporating a generally frusto-conical thread cap that is composed of plastic material such as polyethylene. The thread cap is formed internally to define threads that receive the externally threaded pin portion of a pipe section. The outer portion of the thread cap is formed to define an annular reduced diameter portion that receives an annular flange or wall portion of a metal cap that is provided to enhance the structural integrity of the thread protector at the outer most portion thereof. The annular flange or wall portion of the metal cap is formed to define a plurality of spaced apertures that are adapted to receive plastic material during molding of the thread cap, thus establishing a mechanically interlocked relation between the metal and plastic portions of the thread protector. The annular flange or wall portion of the metal cap interfits with the reduced diameter portion of the plastic thread such that the outer surfaces of the annular flange and the plastic thread cap are substantially contiguous.

The metal cap structure is also formed to define a substantially circular end wall flange deforming a generally circular opening through which the end portion of the thread cap projects. The end portion of the thread cap defines a generally circular end wall having a rectangular aperture formed therein which adapts the thread protector for installation and removal by means of a tool that may be inserted into the rectangular opening or, in the alternative, the rectangular opening is adapted to receive the hook portion of a hook and cable pipe handling system.

A plurality of projections extend from the circular end wall of the plastic thread cap structure and are oriented in generally rectangular form. These projections allow any straight tool such as a screwdriver, bar or the like to be manipulated with respect to the projections in such a manner as to achieve rotation of the thread protector for installation and removal thereof. The projections are formed integrally with the plastic thread cap during molding thereof.

An alternative embodiment of the present invention will incorporate a metal structural member having a circular bottom wall and tapered annular side walls. The side walls will extend a sufficient distance to define a cup-like protective element that completely surrounds the threaded portion of the pipe thread, thereby providing the thread protector with efficient structural integrity for the entire threaded portion of the externally threaded portion of the pipe. The circular bottom wall of the metal element is formed to define a centrally oriented rectangular opening that is adapted to receive hooks or other implements to allow the pipe to be lifted with the thread protectors in place. The bottom wall also is formed to define a plurality of openings through which plastic material extends to thus define a mechanically interlocking connection between the plastic and metal materials of the thread protector.

Within the metal cup-like structural element, a quantity of plastic material is molded in place and is formed to define internal threads that receive the threads of the pipe. The plastic material extends across the inner portion of the circular metal end wall with exception of the rectangular opening that is defined within the end wall. The plastic material is also formed to extend through openings in the tapered side wall of the metal structural element and to form a plurality of external ribs that extend along the outer surface portions of the metal structural element to thus provide for ease in manipulating and handling the thread protector.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

In the drawings

DETAILED DESCRIPTION OF PREFERRED EMBODIMENT

Figure 1:
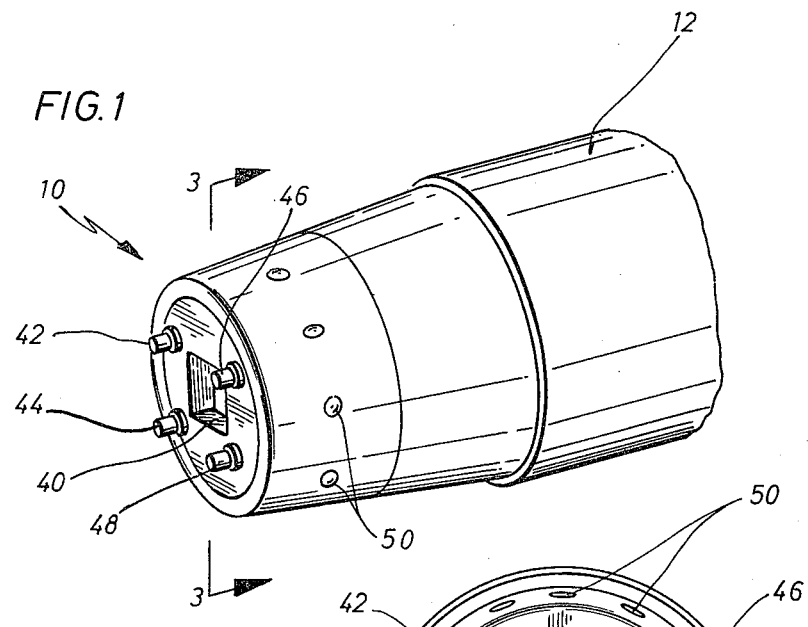
FIG. 1 is an isometric view illustrating the pin portion of a pipe section having a thread protector constructed in accordance with the present invention affixed in protective relation to the externally threaded pin portion thereof.
Figure 3:
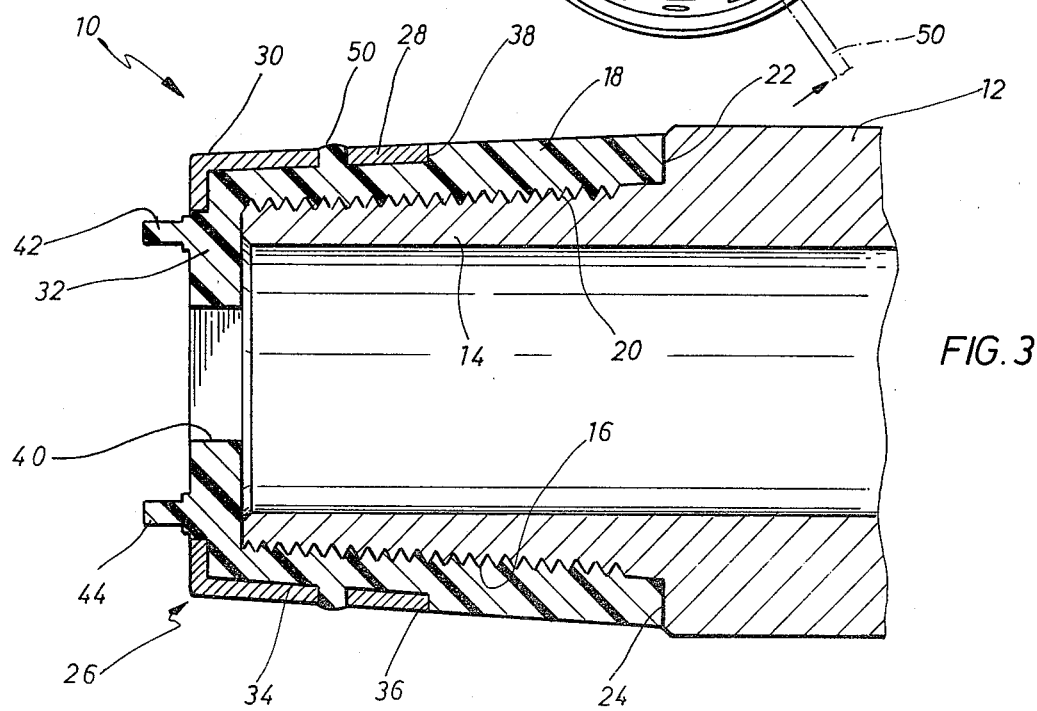
FIG. 3 is a sectional view taken along line 3—3 of FIG. 1 and illustrating the structural details of the thread protector and showing the assembled relation thereof to the pin portion of a section of pipe.

Referring now to the drawings and first to FIG. 1, there is illustrated a thread protector structure generally at 10 which is adapted to be threadably connected to the threaded pin portion of a pipe section, a portion of which is illustrated at 12. As shown in FIG. 3, the pipe section 12 is provided with a reduced diameter pin portion 14 which is formed to define external threads 16 which are received by a corresponding internally threaded portion of an adjacent pipe section for the purpose of interconnecting the pipe sections in assembly. As mentioned above, it is highly desirable that the threads 16 of the pipe section be protected during handling so that a fluid-tight joint may be efficiently made up between pipe sections. Moreover, it is desirable that sections of expensive pipe such as drill pipe be capable of being reused a number of times and handled extensively during the service life thereof. It is desirable, therefore, to provide thread protectors for at least the externally threaded pin portions of the pipe in order that the threads will be protected against damage during all phases of handling. Under field conditions, service personnel involved in handling the pipe and making up or disassembling the pipe sections may be provided with effective tools for installation and removal of thread protectors. Under some circumstances, however, thread protector installation and removal tools are not available and, therefore, it is desirable to provide for installation and/or removal of the thread protectors from the pipe sections through the use of readily available tools or implements. In accordance with the present invention, a thread protector is provided such as shown at 10 in the various Figures which incorporates an inner body portion 18 that is of annular configuration and is composed of a protective plastic material such as polyethylene or any one of a number of other suitable plastic materials. The inner body structure 18 is formed internally to define threads 20 which adapt the body to be threaded onto the pin portion of the pipe section to such extent that the inner extremity 22 of the body 18 comes into contact with an annular shoulder 24 defined by the pipe 12. This feature allows the inner body structure 18 to be brought into tightly locked engagement with respect to the pin portion 14 of the pipe section, thereby preventing the thread protector from becoming inadvertently disassembled from the pipe threads during handling, which might otherwise result in damage to the external threaded pin portions of the pipe.

It is desirable to provide the outer portion of the inner body 18 with enhanced structural integrity for the purpose of preventing damage to the pipe section by objects which are brought into forcible contact with the end portions of the pipe. It is also desirable to provide the thread protector with the capability of resisting the wear and abrasion that might otherwise result when the pipe is dragged from the pipe storage rack to the working floor of the drilling rig. In accordance with the present invention, enhanced structural protection is provided by means of a metal end cap shown generally at 26 which includes an annular body portion 28 that defines the outer peripheral portion 30 of the thread protector. The inner body portion 18 is formed at the outer extremity thereof to define a reduced diameter portion 34 about which the annular body portion 28 is received and further defines an annular shoulder 36 at the intersection of the reduced diameter portion with the full diameter portion of the body. An end surface 38 of the metal body structure 28 is positioned in contact with the annular shoulder structure 36.

The metal cap is formed to define an integral annular end wall flange 32 which is of substantially the same thickness as compared to the metal body portion 28 thereof and provides substantial structural integrity for the outer end portion of the thread protector. The end wall flange 32 defines a generally circular opening 33 through which an end wall portion 35 of the inner body 18 protrudes. The end wall 35 is formed to define a generally rectangular opening 40 which is adapted to receive the hook of a hook and cable pipe handling system to facilitate ready handling of the pipe without requiring removal of the thread protectors. Moreover, the rectangular configuration of the opening 40 allows a rotatable drive tool or wrench to be inserted therein for the purpose of accomplishing rotation of the thread protector during assembly and removal with respect to the pipe threads.

Figure 2:
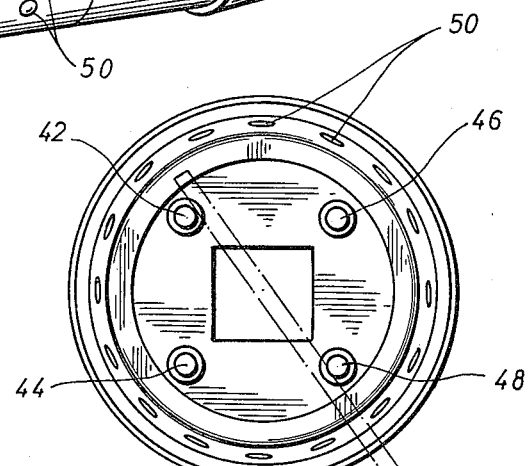
FIG. 2 is an end view of the thread protector structure of FIG. 1.

It is also desirable to provide for installation and removal of the thread protector by means of simple readily available tools such as screwdrivers, bars, etc. since installation and removal will be accomplished in the field perhaps under circumstances where more efficient tools are not readily available. Accordingly, a plurality of projection pins 42, 44, 46 and 48 are shown to extend from the plastic end wall structure 35. These pins are preferably formed integrally with the end wall 35 such as by means of a molding operation, or may be provided in any other suitable manner. The pins 40-48 are located at the outer peripheral portion of the end wall 35 thereby providing operating personnel with the capability of applying substantial leverage in order to achieve rotation of the thread protector during installation and/or removal operations. To rotate the thread protector by means of an elongated tool such as a screwdriver or bar, the tool is positioned across the end wall in the manner shown in broken line in FIG. 2. Force applied against the bar 50 in the direction of the arrow will induce rotating force to opposed pairs of the pins such as shown at 42 and 48. Upon application of the force in the manner shown in FIG. 2, the thread protector will be unthreaded for removal from the pipe. Upon rotation of the thread protector approximately 90° by means of the bar 50, the bar may be placed into contact with other projecting pins such as 44 and 46 for continued rotation thereof. To enhance the structural integrity of the projecting pins, small bosses 37 may be formed by the end wall structure 35 and the pins 42-48 may project directly from these bosses.

The annular body portion 28 of the metal cap structure 26 is formed to define a plurality of apertures 50 that are disposed in substantially equally spaced relation about the periphery of the annular flange or wall portion 28. During molding of the inner body structure 18 or thread cap, the plastic material will flow into the apertures and will become hardened. The plastic inner body structure thus becomes structurally interlocked with the metal end cap structure. The thread protector 10 is typically manufactured by first forming the metal end cap 26 and then placing it within a mold. Uncured plastic material is then injected into the mold to form the inner body structure and to establish a mechanically interlocked relation with the metal end cap. The mold is also designed to form the projecting pins 42-48 and the bosses 37 during the molding process.

The metal end cap 26 is of sufficient structural integrity to withstand the usual impacts that occur during handling of the pipe. Moreover, during dragging of the pipe from the pipe storage rack to the working floor, the metal rim or edge defined by intersection of the body portion 28 and the end wall flange 32 of the metal cap provides effective resistance to wear and abrasion. The edge of the metal end cap is also strengthened by the internal annular end wall flange thereby providing effective resistance to collapsing of the metal end cap as impacts occur during handling of the pipe.

The plastic inner thread cap provides effective cushioning for protection of the pipe threads.

Figure 4:
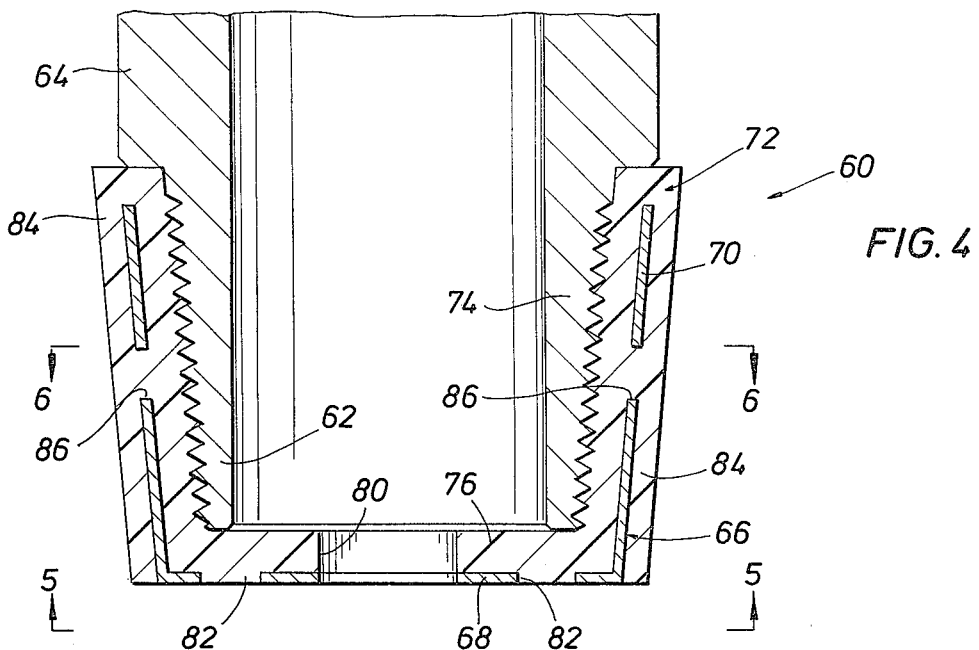
FIG. 4 is a sectional view of a thread protector representing a modified embodiment of the present invention and shown in assembly with the threaded pin portion of a pipe.
Figure 5:
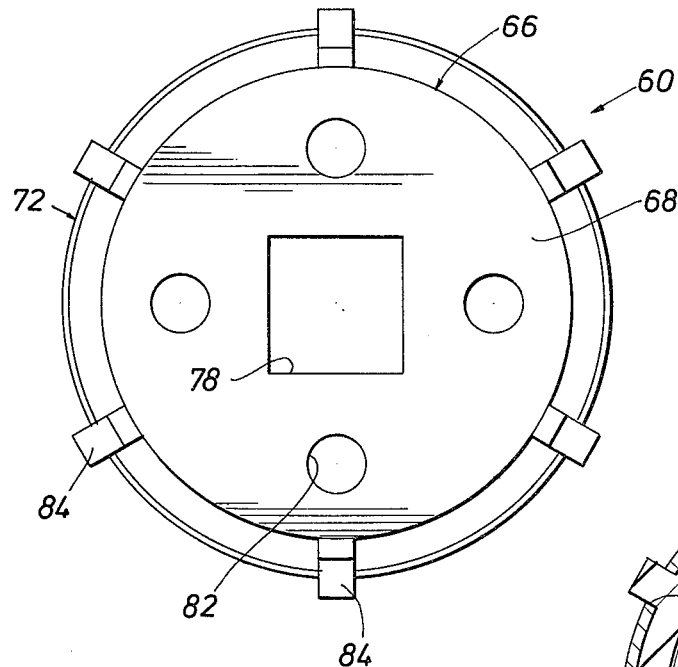
FIG. 5 is an end view of the thread protector of FIG. 4, the view being taken along line 5—5 of FIG. 4.
Figure 6:
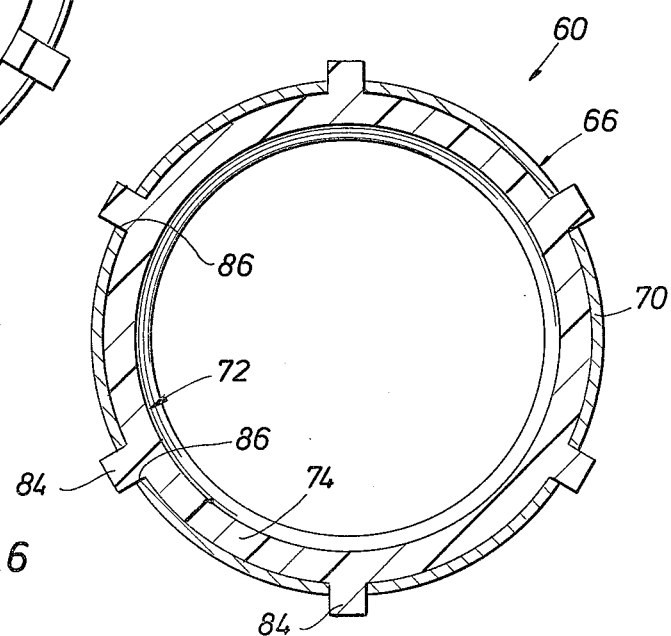
FIG. 6 is a sectional view taken along line 6—6 of FIG. 4 and showing the structural interrelation of the plastic and metal components of the thread protector.

It may be desirable to provide a thread protector mechanism wherein the entire threaded portion of the pipe is enclosed not only by plastic thread protector material but also by a metal thread protector of sufficient structural integrity to withstand severe impact forces. It may also be desirable to provide a thread protector having external ribs in order to facilitate manual rotation and handling of the thread protector by personnel installing or removing the same. In accordance with the present invention, a thread protector accomplishing these features may conveniently take the form illustrated in FIGS. 4, 5 and 6 where a thread protector is shown generally at 60. To provide the externally threaded pin portion 62 of the pipe 64 with efficient protection against impact forces of severe magnitude, the thread protector 60 is provided with a metal structural element shown generally at 66 which incorporates a generally planar circular end wall 68 from which extends a tapered annular thread protector wall 70 of tapered or frustoconical configuration. The wall 70 is of sufficient length to extend from the end wall 68 and encompass the entire externally threaded portion of the pipe 64. In the event the externally threaded pin portion of the pipe is slammed into any fixed object or is struck in any other manner, the metal thread protector wall 70, being of good structural integrity, will withstand such impact forces. The metal structural element 66 is of cup-like configuration and the inner periphery thereof and the inner portion of the end wall 68 is lined with inner wall portions of a body of plastic material illustrated generally at 72. The inner wall portion 74 of the plastic body 72 is formed to define internal threads that receive the externally threaded portion of the pipe 64 in threaded engagement therewith. Thus, the thread protector is secured to the pipe by the pipe threads and is readily retained in assembly with the pipe. The plastic body 72 also forms an inner wall portion 76 that is positioned against the inner wall surface of the metal end wall 68 of the thread protector.

The end wall 68 of the thread protector is formed to define a generally rectangular centrally located opening 78 through which may be extended a lifting hook or any other suitable lifting implement for the purpose of handling the pipe 64 with the thread protectors in place. The plastic end wall 76 is formed to define a mating rectangular opening 80 that is coincident with the opening 78 of the metal end wall 68. The end wall 68 is also formed to define a plurality of locking openings 82 through which portions of the plastic end wall 76 extend in order to establish an interlocking relationship with the metal wall portion 68 of the structural element 66.

As mentioned above, it may be desirable to provide the thread protector 60 with external ribs to facilitate manual manipulation of the thread protector. According to the present invention, a plurality of external plastic ribs 84 are defined by the plastic body 72, which ribs extend along the outer wall surface of the thread protector wall 70 of the structural element 66. To provide the ribs with a degree of structural integrity, the thread protector wall portion 70 of the structural element 66 is formed to define a plurality of openings 86. The plastic material of plastic body 72 will extend through the openings 86 thereby interconnecting the ribs 84 with the inner wall portion 74 of the plastic body. The rib elements 84 are thereby given a sufficient amount of structural integrity to withstand the forces to which they will be subjected during use. Further, the rib elements 84 provide the thread protector mechanism with further impact resistant capability since the ribs will be the first structural elements to receive impact forces. The ribs will be formed significantly under impact forces, thereby dissipating energy that is applied to the metal structural elements 66 of the thread protector.

Figure 7:
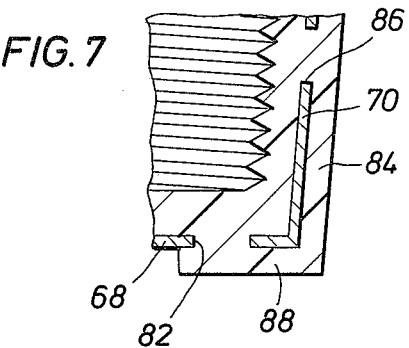
FIG. 7 is a fragmentary sectional view of a thread protector structure representing a further modified embodiment of this invention.

If desired, as illustrated in FIG. 7, the rib elements 84 may extend over a portion of the planar wall 68 with the plastic material of the plastic body 72 extending through the aperture 82 and being integral with a portion 88 of each of the ribs. This feature provides the end portions of each of the ribs with efficient structural integrity, providing the ribs with a greater force resisting capability.

While the foregoing is directed to the preferred embodiments of the present invention, other and further embodiments of the invention may be devised without departing from the basic concept thereof, and the scope thereof is determined by the claims which follow.

I claim:

1. A thread protector for the tapered external threads of pipes, said thread protector comprising:
(a) a thread cap composed of synthetic plastic material and being formed to define tapered internal threads adapted to receive the externally threaded pin portion of a pipe, said thread cap defining an outer frusto-conical side wall;
(b) a metal cap being received about at least a portion of said thread cap and defining a frusto-conical side wall and a planar end wall flange forming a circular central opening, said side wall being formed to define a plurality of locking openings;
(c) said thread cap defining an end wall forming a central thread cap opening in substantially concentric relation with said central opening;
(d) a plurality of projections extending from said end wall of said thread cap within said circular central opening, said projections being oriented in substantially evenly spaced relation and adjacent said end wall flange for engagement by a straight tool to facilitate installation and removal of said thread protector; and
(e) a plurality of integral locking portions extending from said thread cap through said locking openings and establishing a mechanically interlocked relation between said thread cap and said metal cap.

2. A thread protector as recited in claim 1, wherein: said projections extend from said end wall of said thread cap and extend beyond said planar end wall flange of said metal cap.

3. A thread protector as recited in claim 2, wherein: said projections are four in number and are oriented in rectangular relation on said end wall.

4. A thread protector as recited in claim 2, wherein: said central thread cap opening is of rectangular configuration and is formed centrally of said end wall and adapted to receive a rectangular drive tool for installation and removal of said thread protector.

5. A thread protector as recited in claim 2, wherein:
(a) said end wall is formed to define a plurality of bosses projecting therefrom; and
(b) said projections extend respectively from said bosses and said bosses enhance the structural integrity of said projections.

6. A thread protector as recited in claim 1, wherein:
(a) said thread cap is formed externally thereof to define a reduced diameter frusto-conical portion; and
(b) said metal cap is received by said reduced diameter portion in such manner that the outer surface thereof is substantially contiguous with the outer frusto-conical side wall surface of said thread cap.

7. A thread protector for the tapered external threads of pipes, said thread protector comprising:

(a) a thread cap composed of synthetic plastic material and being formed to define tapered internal threads adapted to receive the externally threaded pin portion of a pipe;

(b) a metal structural element being received about the external portion of said thread cap and defining a planar end wall forming a central opening and a plurality of first locking openings surrounding said central opening and a tapered annular thread protector wall extending the length of said tapered internal threads, said thread protector wall forming a plurality of second locking openings;

(c) said thread cap defining an end wall in contact with the inner surface of said end wall of said metal cap and forming a central opening coincident with said central opening of said end wall of said metal structural element;

(d) a plurality of external ribs being integral with said thread cap and extending along said thread protector wall and at least a portion of said planar end wall of said structural element, said ribs being interconnected through said first locking openings with said thread cap intermediate the extremities of said thread protector wall and along at least a portion of said planar end wall; and (e) a plurality of integral locking portions extending from said thread cap through said locking openings and establishing a mechanically interlocked relation between said thread cap and said metal cap.

* * * * *